United States Patent [19]

Kinser

[11] 4,237,645

[45] Dec. 9, 1980

[54] COMBINATION MARINE LIFE TRAP

[76] Inventor: Warren H. Kinser, P.O. Box 1726, Kodiak, Ak. 99615

[21] Appl. No.: 878,992

[22] Filed: Feb. 17, 1978

[51] Int. Cl.$^3$ ............................................ A01K 69/10
[52] U.S. Cl. ........................................ 43/102; 43/105
[58] Field of Search .................... 43/64, 65, 100, 101, 43/102, 103, 104, 105, 106

[56] References Cited

U.S. PATENT DOCUMENTS

| 1,106,318 | 8/1914 | Ross | 43/105 |
|---|---|---|---|
| 1,223,851 | 4/1917 | Carter | 43/105 |
| 1,336,356 | 4/1920 | Johnson | 43/105 |
| 1,447,502 | 3/1923 | Asanio et al. | 43/100 |
| 1,728,645 | 9/1929 | Ward et al. | 43/100 |
| 1,958,724 | 5/1934 | Stanislaw | 43/100 |
| 2,163,973 | 6/1939 | Benca et al. | 43/100 |
| 2,196,928 | 4/1940 | Lile | 43/100 |
| 2,728,164 | 12/1955 | Mears | 43/105 |
| 3,380,187 | 4/1968 | Werstlein | 43/100 |
| 3,484,981 | 12/1969 | Gilmer | 43/105 |
| 3,605,320 | 9/1971 | Wells | 43/100 |

FOREIGN PATENT DOCUMENTS

| 210665 | 6/1909 | Fed. Rep. of Germany | 43/102 |
|---|---|---|---|
| 332627 | 11/1903 | France | 43/100 |
| 357169 | 12/1905 | France | 43/100 |
| 927724 | 11/1947 | France | 43/102 |
| 1043571 | 11/1953 | France | 43/105 |
| 1080705 | 12/1954 | France | 43/102 |
| 1280730 | 11/1960 | France | 43/105 |
| 18665 | 3/1909 | Norway | 43/102 |
| 72200 | 6/1947 | Norway | 43/105 |
| 146630 | 8/1954 | Sweden | 43/105 |

*Primary Examiner*—Nicholas P. Godici
*Assistant Examiner*—K. Bradford Adolphson
*Attorney, Agent, or Firm*—Clarence A. O'Brien; Harvey B. Jacobson

[57] ABSTRACT

A trap for marine life which includes the combination of an enlarged trap in the shape of a truncated pyramid having an entrance opening in the top thereof and a trap structure mounted on the top wall which includes a peripheral open area to enable access to the opening in the top wall of the trap with the trap structure including a peripheral net which can be moved to a closed position when lifting the trap to retain the marine life therein. The openable and closable peripheral netting on the trap structure mounted on the top wall of the pyramidal trap includes a centrally located elastic member to retain the netting in a folded condition to define an opening generally coincident with the opening in the top wall of the pyramidal trap. The top edge of the side netting on the trap structure is vertically movable between a lowermost position in which the periphery of the trap structure is open to an elevated position in which the periphery of the trap structure is closed by the side netting.

12 Claims, 14 Drawing Figures

COMBINATION MARINE LIFE TRAP

BACKGROUND OF THE INVENTION

1. Field of the Invention

The present invention generally relates to a marine life trap including the combination of a generally truncated pyramidal trap having an entrance opening in the center of the top wall thereof and an openable and closable trap structure including a side netting which can be moved between open and closed positions to provide access into the interior of the pyramidal trap but preventing escape of marine life from the trap when the side netting is closed, thereby facilitating the trapping of various types of marine life which can be enticed into the trap by bait, light, or other enticement means.

2. Description of the Prior Art

Various patents have been granted relating to devices for trapping various species of marine life with the prior patents known to applicant being as follows:

U.S. Pat. No. 690,507—Jan. 7, 1902
U.S. Pat. No. 1,447,502—May 6, 1923
U.S. Pat. No. 1,958,724—May 15, 1934
U.S. Pat. No. 2,639,540—May 26, 1953
U.S. Pat. No. 3,029,546—Apr. 17, 1962
U.S. Pat. No. 1,336,356—Apr. 6, 1920
U.S. Pat. No. 3,605,320—Sept. 20, 1971
French Pat. No. 1,280,730—Nov. 1961.

SUMMARY OF THE INVENTION

An object of the present invention is to provide a combination trap for marine life which includes the combination of a truncated pyramidal trap having a large access opening in the top wall thereof generally similar to the trap disclosed in U.S. Pat. No. 3,605,320 and a trap structure superimposed thereon which includes a peripheral side net movable between open and closed positions generally similar to the trap disclosed in my copending application U.S. Ser. No. 771,795, filed Feb. 24, 1977, for Marine Life Trap, now U.S. Pat. No. 4,156,984 issued June 5, 1979 which is a continuation-in-part of Ser. No. 636,588, filed Dec. 1, 1975, now abandoned, with the disclosure of the aforementioned applications and patent being incorporated herein by reference thereto.

Another object of the invention is to provide a combination trap for marine life in which the trap structure is connected to the top wall of the pyramidal trap in enclosing relation to the opening in the top wall of the pyramidal trap with the trap structure being closable when the trap is being lifted from its supported position to retain all marine life therein, thereby avoiding possible loss of some of the "catch", such as can occur when a trap such as that disclosed in U.S. Pat. No. 3,605,320 is lifted by a fishing vessel which is subject to rolling, pitching, and the like, due to wave action which frequently lets the trap float or move downwardly after being partially lifted which results in marine life escaping through the relatively large hole in the top wall of the trap.

A further object of the invention is to provide a combination marine life trap which can be stacked aboard a fishing vessel, dock, or the like, in a compact manner and provides large catch capabilities and can be easily dumped after it has been lifted on board a fishing vessel, thereby rendering the retrieval, dumping and resetting of the trap more efficient.

Still another object of the invention is to provide a combination marine life trap which is rugged but yet simple in construction and includes various enticement means or the capability of utilizing various enticement means for marine life.

Still another important object of the invention is to provide a trap in accordance with the preceding objects having unique structural arrangements so that the side netting which is normally open when the trap is fishing, will be closed in response to lifting force exerted on the trap when it is to be lifted aboard a fishing vessel for dumping into a sorting or storage area for the "catch".

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Referring now specifically to the drawings, the combination marine life trap of the present invention is generally designated by reference numeral 20 and when in use, it will be supported on a supporting surface 22 such as the bottom of a body of water 24 with the trap including an elongated flexible line, such as a rope, 26 extending upwardly therefrom and connected to a float 28 at its upper end to facilitate location of the trap so that personnel on a fishing boat may easily retrieve the trap 20 by lifting it onto a fishing vessel and dumping the "catch" onto a sorting area, into a storage container, hold, or the like, in a conventional and well-known manner. The combination trap 20 includes a bottom or lower trap generally designated by numeral 30 and which is generally in the shape of a truncated pyramid and hereinafter designated as the pyramidal trap. Superimposed on and secured to the pyramidal trap 30 is a trap structure generally designated by the numeral 32 which provides means for closing the combination trap 20 when an upward force is exerted on the flexible line such as when lifting the trap from the bottom 22 of the body of water thereby preventing escape of marine life from the trap.

The pyramidal trap 30 includes a bottom peripheral frame 34 in the form of an annular ring of square, rectangular or other suitable configuration with the frame 34 preferably being in the form of a rod of metal or other suitable material of cylindrical or other suitable cross-sectional configuration, although other rigid frame members of different shapes and configurations may be employed. Rigidly connected with, such as by welding or other rigid securing means, and extending upwardly from the bottom frame 34 are four corner members 36 which converge inwardly and upwardly and are rigidly affixed to a top frame 38 constructed in the same manner as the bottom frame but having a smaller perimeter thus defining a rigid framework for the pyramidal trap. Netting 40 is secured to the framework defined by the lower frame 34, upper frame 38 and corner frame members 36. To further rigidify the upper and lower frames and support the netting 40, intermediate braces, in the form of rods, 42 interconnect the central portions of the four sides of the lower frame 34 and the upper frame 38.

Figures 1, 10, 11:
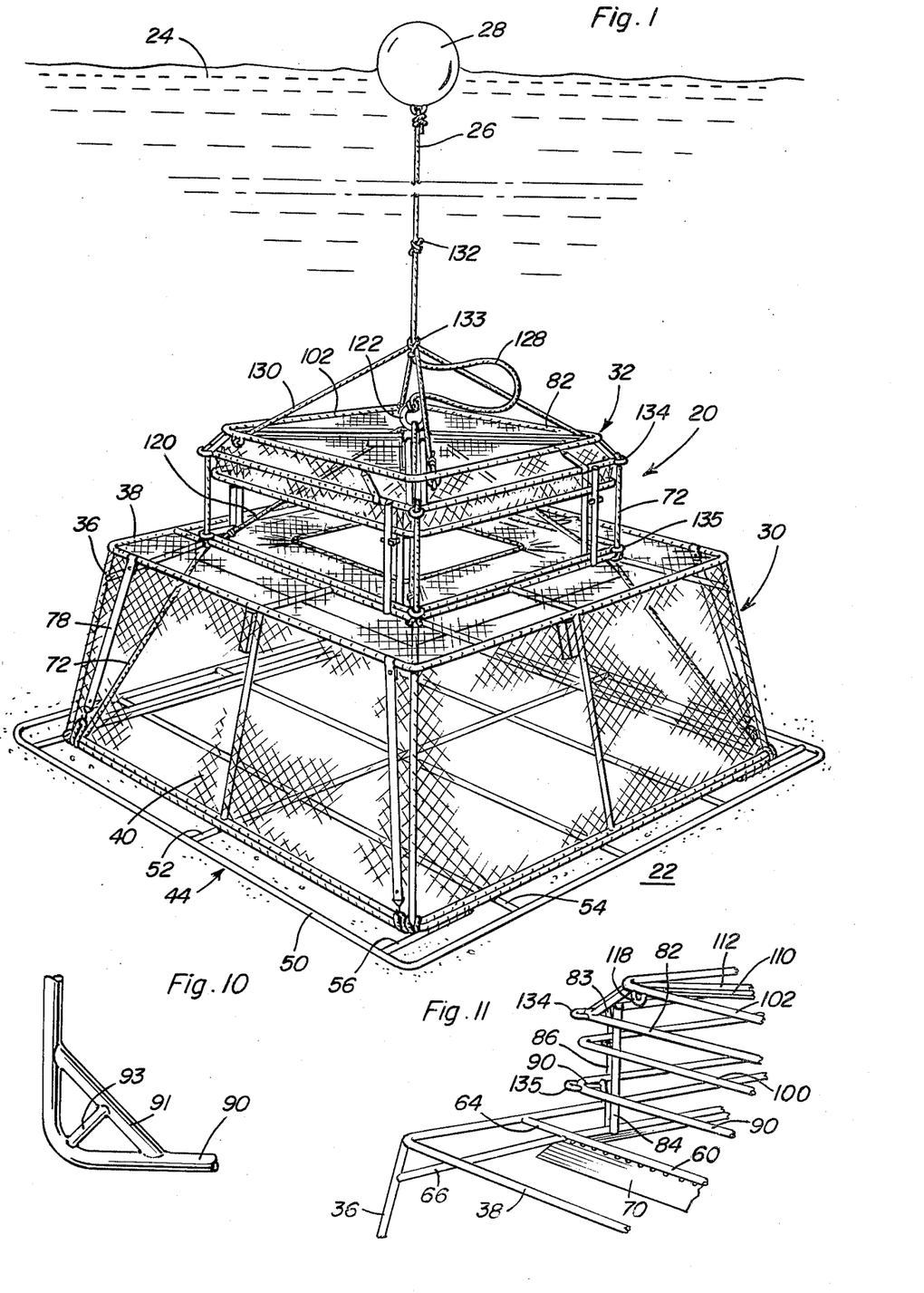
FIG. 1 is a perspective view of the combination marine life trap of the present invention illustrating the orientation thereof when the trap is set for fishing.
FIG. 10 is a fragmental plan view of the corner of the movable frame of the trap structure.
FIG. 11 is a fragmental perspective view of the trap structure and upper portion of the pyramid trap with the netting removed illustrating further structural details and association of the components.

The pyramidal trap 30 includes a detachable bottom structure generally designated by numeral 44 which includes a peripheral frame 46 closely underlying the lower frame 34 and which includes bottom netting 48 connected thereto for forming a closure for the bottom of the pyramidal trap 30. Rigidly affixed to the bottom frame 46 is a peripheral frame 50 forming a guard for the trap and generally conforming in shape to the frame 46, but having a greater perimeter and spaced concentrically outwardly therefrom. Bottom reinforcing rods 52 and 54 interconnect opposite side portions of the frame 50 with a plurality of rods 54 being used and a single rod 52 being rigidly connected to each other and connected to the bottom frame 46 as illustrated in FIG. 1. Short corner rods 56 rigidly connect the corner portions of the frame 50 with the bottom frame 46, also as illustrated in FIG. 1, so that the bottom 40 includes a rigid structure with a netting 48, a bottom frame 46 and the guard frame 50 rigidly connected with the bottom frame 46 by rods 52, 54 and 56, with the guard frame 50 protecting the netting and structure for releasably securing the bottom 44 to the pyramidal trap 30.

Figures 2, 8, 9:
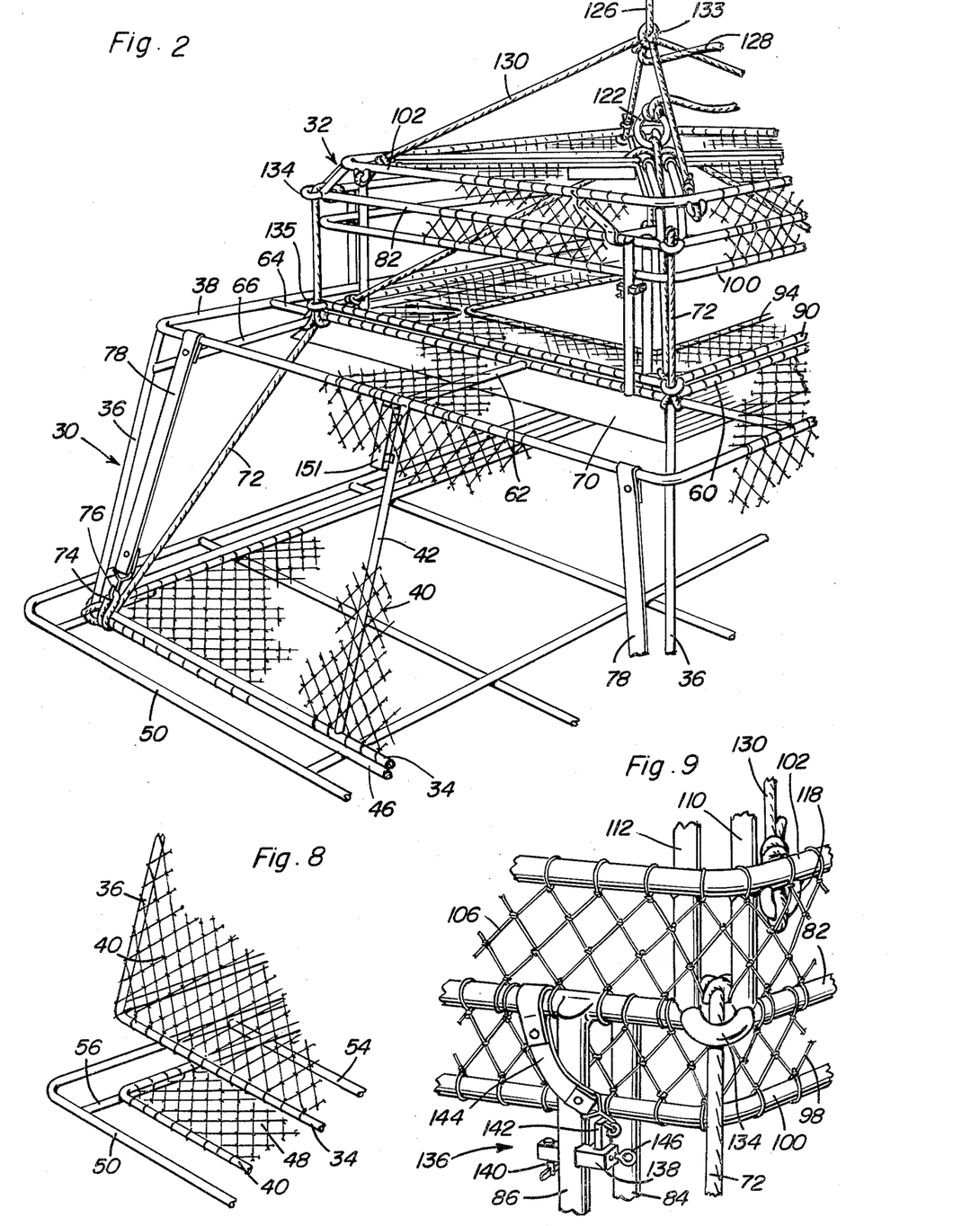
FIG. 2 is a fragmental, perspective view of a portion of the trap illustrating further specific structural details thereof.
FIG. 8 is a fragmental, perspective view of the lower corner of the pyramidal trap illustrating the separation of the bottom forming member from the peripheral wall to facilitate removal of the "catch" from the trap.
FIG. 9 is an enlarged perspective view illustrating the guide and latch structure for the movable net ring.

The top of the pyramidal trap 30 includes an enlarged access opening 58 defined by a frame member 60 in the same plane of the frame 38 and concentric therewith and spaced inwardly therefrom and supported rigidly in relation thereto by brace rods 62 extending inwardly from the center of the side portions of the top frame 38 and also brace rods 64 extending inwardly from the frame 38 to the corners of the frame 60 with the brace rods 64 being in alignment with one of the side portions of the frame 60. A downwardly inclined brace rod 66 extends from each corner of the frame 60 of the opening to a corner member 36 for rigid connection therewith at a point spaced below the corner of the top frame 38, as illustrated in FIG. 2, thus providing a rigid support for the frame 60 of the opening 58. Netting 68 extends from the top frame 38 to the opening frame 60 to provide a closure for the top wall of the pyramidal trap 30, except for the enlarged opening 58. The frame 60 is provided with a depending and outwardly inclined flange 70 throughout the periphery thereof which generally parallels the inclination of the peripheral side wall of the pyramidal trap to prevent crawling species of marine life from exiting through the opening 58 after they have entered the pyramidal trap 30 through the opening 58, such as might occur if the marine life, such as crabs, lobsters, and the like, crawl upwardly along the interior of the netting.

Figure 12:
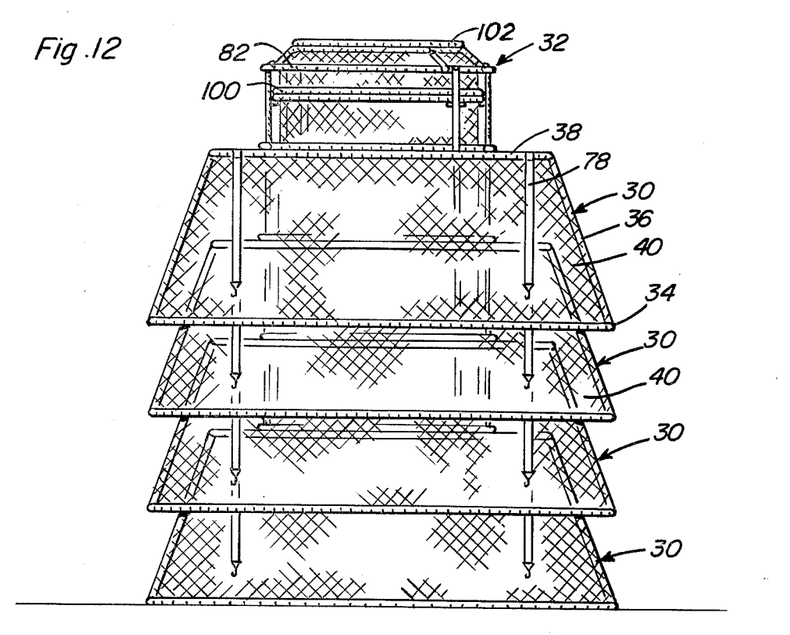
FIG. 12 is a side elevational view illustrating a plurality of combination marine life traps oriented in stacked position with the bottoms removed.
Figure 13:
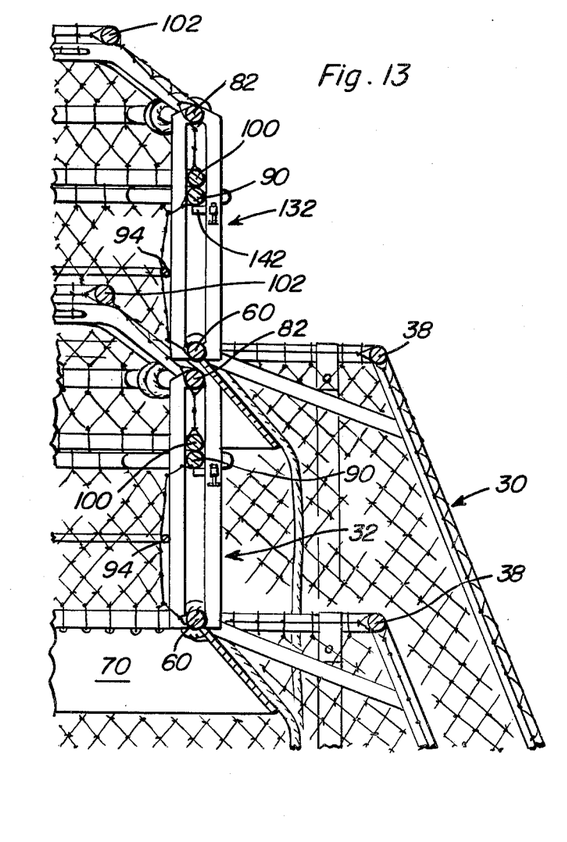
FIG. 13 is a fragmental sectional view illustrating the relationship of two of the stacked traps.
Figure 14:
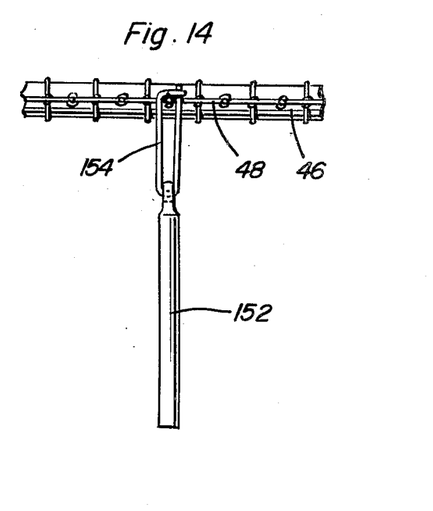
FIG. 14 is a fragmental view illustrating an optional arrangement for supporting a light from the bottom of the trap.

A rope 72 is looped around the frame 60 at each corner thereof and extends downwardly in the interior of the pyramidal trap 30 and is looped around the corner portions of the frames 34 and 46 and around the corner member 36 and terminates in a loop 74 that is engaged by a hook 76 on an elongated flexible strap 78 extending downwardly from the top frame 38. Each of the straps 78 is constructed of elastic material which retains the rope 72 looped around the frames 34 and 46 and the corner members 36 at the corners of the frames to retain the bottom 44 attached to the frame 34. By releasing the hook 76 by stretching the strap 78, the loop 74 can be moved in a manner to disconnect the lower end of the rope 72 from engagement around the frames 46, 34 and corner members 36, thereby detaching the bottom 44 from the pyramidal trap 30 to facilitate stacking of the traps in vertically superimposed relation. By releasing all but two of the straps 78 at one side of the pyramidal trap 30, the bottom 44 can be swung downwardly to an open position to facilitate dumping of marine life trapped in the trap into a storage area, hold, onto a sorting area, or the like. FIGS. 12 and 13 illustrate the relationship of the traps when stacked with the bottoms 44 removed.

The trap structure 32 is mounted on the top wall of the pyramidal trap 30 and is generally square or other suitable shape in plan configuration with a perimeter smaller than the top frame 38 of the pyramidal trap 30 and generally concentric in relation thereto and overlying and forming a closure for the opening 58 with the periphery of the trap structure 32 being mounted on and rigidly affixed in relation to the frame 60 which defines the periphery of the opening 58. The trap structure 32 includes four upstanding supporting and guiding structures 80 which are rigidly connected with the frame member 60 at their lower ends and rigidly connected to a frame 82 at their upper ends with the frame 82 being the same size as the frame 60 and constructed in substantially the same manner, that is, by the use of a peripheral rod defining a generally square or other suitable configuration. The supporting and guiding assemblies 80 are located adjacent the corners of but slightly spaced from the corners of the frame 60 and the frame 82 and each of these assemblies includes a pair of vertically disposed, spaced, laterally offset, parallel rods 84 and 86 which extend alongside and are rigidly affixed to the frame member 60 in perpendicular relation thereto and the upper ends of the rods 84 and 86 are associated with the frame 82 in the same manner, thus rigidly supporting the frame 82 in spaced parallel relation to the frame 60 with the space between the parallel inner surface of the rods 84 and 86 defining, in effect, a vertical guide slot 88.

Figure 6:
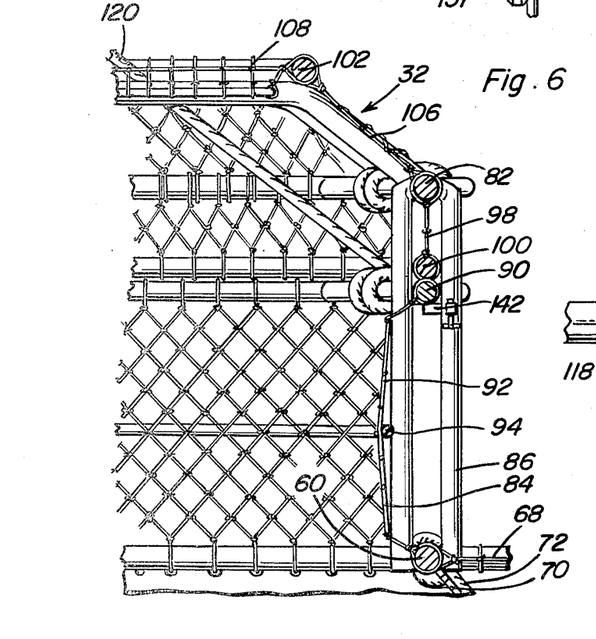
FIG. 6 is a fragmental sectional view similar to FIG. 3 but illustrating the side netting in raised and closed position.

Movably positioned in the peripherally spaced guide slots 88 is a movable frame 90 in the form of an annular ring which has a perimeter and cross-sectional size and configuration substantially the same as the frames 60 and 82 so that the movable frame 90 can be moved vertically in the guide slots 88. A side netting 92 has its lower end attached to the frame member 60 and its upper end attached to the movable frame 90 so that when the movable frame 90 is at an elevated position remote from the frame 60, as illustrated in FIG. 6, the side netting 92 will be substantially vertically oriented, although the central area thereof will be disposed inwardly of the inner rods 84 of the supporting and guide assembly 86. The side netting 92 is also provided with an elastic band, strap, or the like, 94 disposed centrally thereof which will fold the netting 90 into a generally horizontal orientation inwardly of the frame 60 and the movable frame 90 when the movable frame 90 is in its lowered position with the elastic band 94 defining an opening 96 generally concentric with and in alignment with the opening 58, as illustrated in FIG. 2, so that marine life will have access into the interior of the pyramidal trap 30 by passing through the space between the supporting and guiding assemblies 80 and above the movable frame 90 when the movable frame 90 is in its lowered or open position. When the movable frame 90 is elevated to its closed position, as illustrated in FIG. 6, the side netting 92, along with other structure defined hereinafter, will form a closure for the periphery of the trap structure 32 and prevent egress of marine life from the interior of the combination trap 20, thereby preventing escape of the "catch" when the trap is being lifted to a fishing vessel, or the like.

Depending from the frame 82 is a short side netting 98 disposed between the upper end portions of the supporting and guiding rods 84 and 86 and the lower end of the netting 98 is provided with a frame 100 in the form of a peripheral ring similar in shape and configuration to the movable frame 90. As illustrated in FIG. 6, when the movable frame 90 is elevated, it will just contact the frame 100 which is held in place by gravity. This short, flexible netting 98 and the frame 100 will assure that the periphery of the trap structure 32 will be closed when the movable frame 90 has been elevated to its uppermost position with the netting 92 being generally vertically disposed.

Disposed above and inwardly of the frame 82 is a top frame 102 which is the same shape as the frame 82 but of lesser perimeter and concentrically oriented with respect to the frame 82 but slightly elevated above the frame 82 with the corners of the frame 102 being rigidly connected with the corners of the frame 82 in a manner set forth hereinafter. The space between the frames 82 and 102 is closed by netting 106 and the top wall of the trap structure 32 defined by the frame 102 is also provided with netting 108. Thus, the entire trap is provided with a netting which forms a closure therefor when the movable frame 90 is in elevated or closed position, but when the movable frame 90 is lowered to its open position, access is provided into the interior of the trap 20 completely about the periphery of the trap structure 32 so that crawling and swimming species of marine life may have ready access to the interior of the trap 20.

Figure 5:
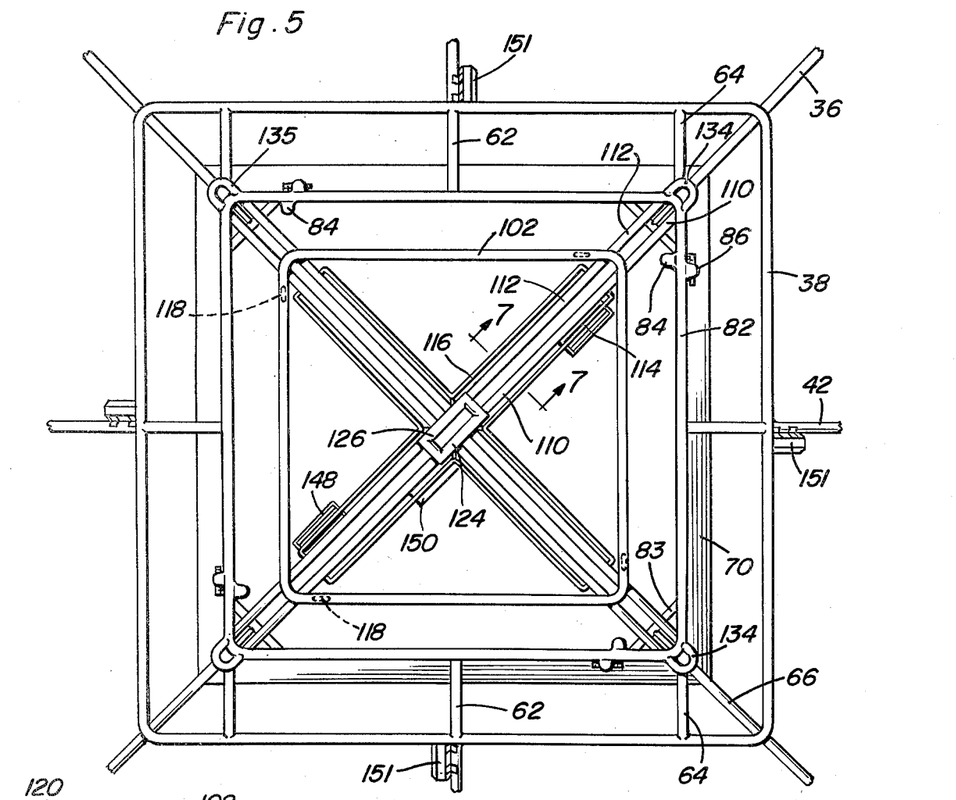
FIG. 5 is a plan view of the trap structure with the netting removed to illustrate the association of the structural components of the trap structure.
Figure 7:
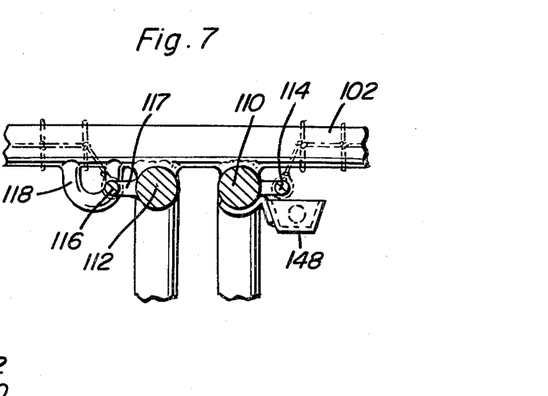
FIG. 7 is a transverse, sectional view taken substantially upon a plane passing along section line 7—7 of FIG. 5 illustrating further structural details of the trap structure and one of the lights mounted thereon.

The frame 102 is provided with four radially extending pairs of spaced parallel rods 110 and 112 which define frames extending inwardly from the corners of the frame 102, as illustrated in FIG. 5, with the particular structure of the rods 110 and 112 also being illustrated in FIG. 7. The rods 110 and 112 are disposed below frame 102 and are rigidly secured thereto with the ends of the spaced rods 110 and 112 being downwardly inclined and rigidly secured to frame 82 as shown in FIG. 11. The top netting 108 is secured to smaller rods 114 and 116, respectively, which are disposed alongside of and adjacent the larger brace rods or frame rods 110 and 112 with the ends of these rods either being secured directly to the frame 102 or short bracket structures 117 on the outer ends the rods 110 or 112, as illustrated in FIGS. 5 and 7. A guide eye 118 is provided on the bottom of frame 102 as illustrated in FIG. 7 for a purpose set forth hereinafter.

Figure 3:
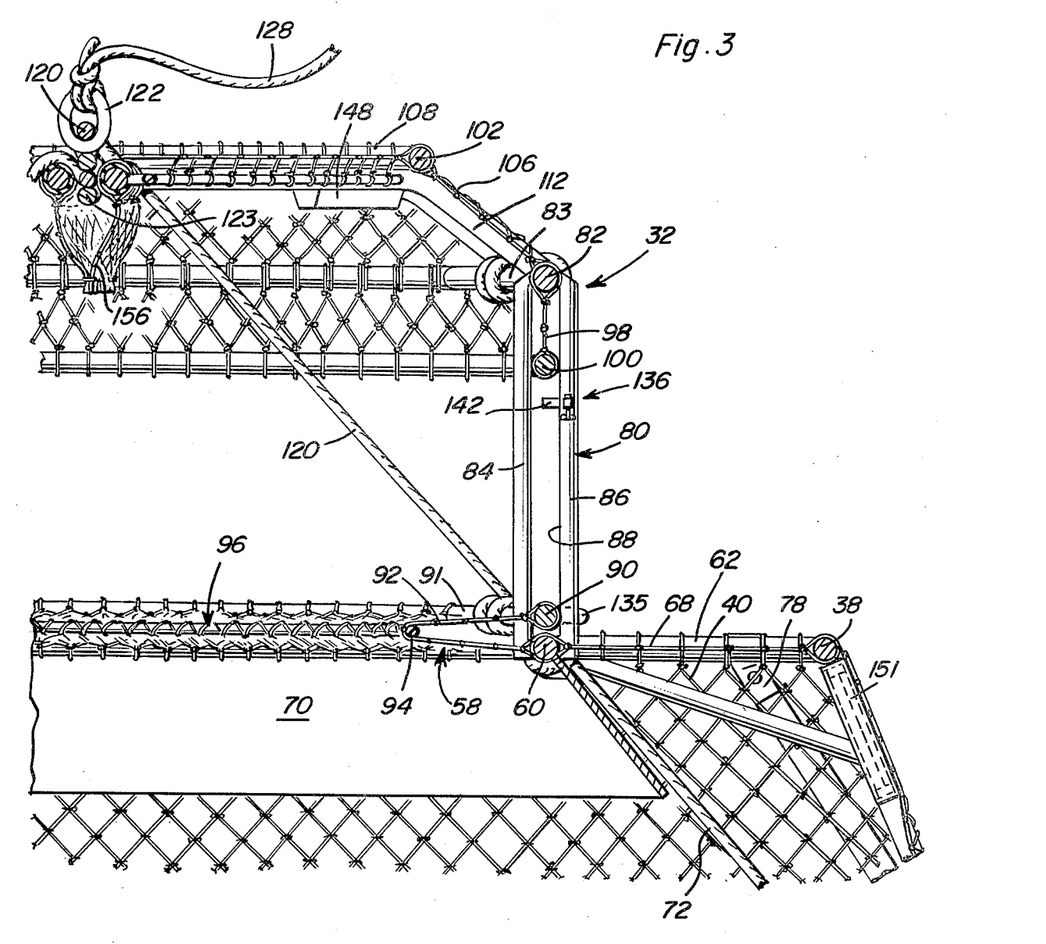
FIG. 3 is a vertical sectional view, on an enlarged scale, illustrating the specific structural relationship between the trap structure and the upper portion of the pyramidal trap, including the relationship between the entrance opening in the pyramidal trap and the opening defined by the elastic member retaining the open side netting in folded condition.
Figure 4:
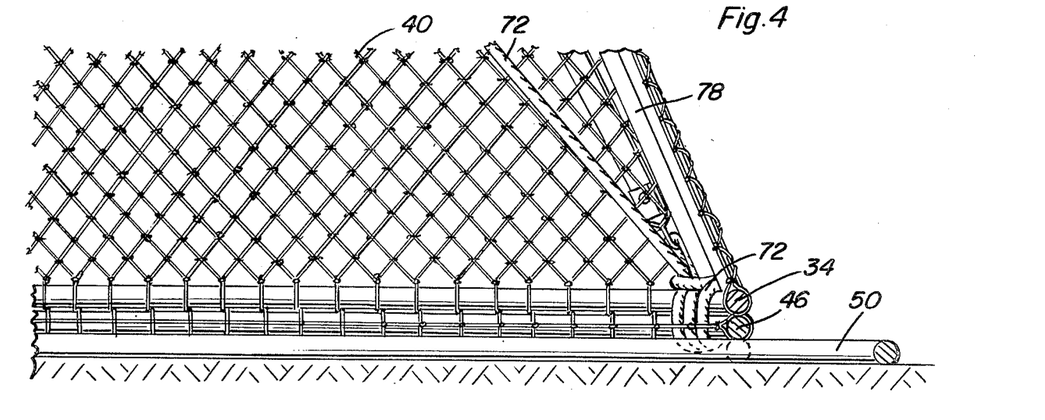
FIG. 4 is a fragmental sectional view, on an enlarged scale, illustrating the bottom portion of the structure of the pyramidal trap.

In order to elevate the movable frame 90 to close the trap, flexible lines or ropes 120 have their ends connected with the movable frame 90 adjacent the corners thereof. Each of the lines 120 extends up through the slot defined by the spaced rods 110 and 112 and through a lifting and connecting ring 122 with the other end of each of the two lines 120 being connected to the diagonally opposite corners of the movable frame 90. Thus, two lines 120 are provided with the remote ends of the two lines being attached to the diagonally opposite corners of the movable frame 90 and the central portion of each of the lines 120 extending up through the slot defined by the spaced rods 110 and 112 and through the lift ring 122 which includes two rigid segments in perpendicular relation to each other with one of the ropes or lines 120 extending through the lowermost of the two rigid rings and the other rope 120 extending through the uppermost of the two rings as illustrated in FIG. 3. The two spaced rods 110 and 112 include a soft insulating covering material 124, as illustrated in FIGS. 3 and 5, which define generally a rectangular slot-like structure guiding and receiving the lower of the two rings 122. This insulation cushions and isolates the ring assembly 122 from the rods 110 and 112 which forms a part of the framework and facilitates seating of the ring 122 with the smaller of the two rings designated by numeral 123 being received in the slot 126 defined by the insulation material 124. Thus, when the ring 122 is elevated, the ropes or lines 120 will lift the movable frame 90 from its lowered, open position to its elevated, closed position, that is, from the position illustrated in FIG. 3 to the position illustrated in FIG. 6. The line 26 extending to the float 28 is provided with a slack portion 128 connected with the ring 122 so that wave action at the surface of the body of water 24 will not move the movable frame 90. This slack portion 128 is maintained by a plurality of elastic straps 130 which are attached to the line 26 above the ring 122 and which diverge outwardly and are connected to the frame 102 adjacent the corners thereof with the eyes 118 locating and protecting the elastic straps 138 where the terminal ends are connected to frame 102. The length of the elastic straps 130 is such that the line 26 is oriented so that the slack portion 128 will be maintained with the float 28 at the nominal surface of the body of water and the slack portion 128 is of sufficient length to compensate for wave action which would possibly elevate the float 28. The float 28 may be constructed in such a manner that during violent wave action, the upward buoyancy thereof would be overcome by the resilient force exerted by the elastic straps 130 as they were elongated to a point that the slack portion 128 would approach a straight condition, so that even if abnormal wave action occurs at the surface of the body of water, the trap will still remain open and continue to catch marine life. A knot 132 may be provided in the line 26 at any desired point to enable detachment of the float and major portion of the line when the traps are being disposed in vertically stacked relation and a knot 133 is provided to prevent the ends of the elastic straps 130 from sliding down the line 26.

The support ropes 72 also extend between the corners of frame 82 and frame 60 to provide additional supporting capacity for the trap and these ropes also extend through corner guide loops 135 attached to the corners of the movable frame 90 to further stabilize and guide movement of the frame 90. The upper end of ropes 72 extend through a guide eye 134 on the outer perimeter of frame 82, extend between the lower ends of guide rods 110 and 112 and tied to a transverse corner brace 83 on frame 82. The ropes 72 which are looped around frame 60 and bottom frame 34 as well as the frame 46 serve to support the weight of the "catch" when lifting the trap onto a fishing vessel or the like, especially when the trap has become substantially filled with marine life, thereby preventing accidental rupture of the components of the trap due to heavy weight of the "catch".

With this construction, the float will facilitate retrieval of the trap but it will not cause the trap to close even during heavy seas. When the trap is to be lifted, upward force exerted on the lift line 26 will first move the movable frame 90 to a closed elevated position to prevent escape of marine life from the trap and then elevate the trap to the surface of the water or the trap may be elevated by various other conventional means commensurate with good fishing procedures.

When the movable frame 90 is elevated to its closed position, a latch mechanism 136 is provided to retain the movable frame 90 in its closed, elevated position between the inner guide rods 84 and the outer guide rods 86, as illustrated in FIG. 9. The latch structure 136 is similar to that disclosed in my aforementioned copending application and includes a mounting block 138 insertable through an aperture in the outer post 86 and retained in place by a retaining pin 140 extending through one end of the mounting block. The other end of the mounting block 138 includes a pivotally mounted retaining latch member 142 which can be oriented in vertical position, as illustrated in FIG. 9, or in horizontal position underlying the frame 90 when in elevated position, as illustrated in FIG. 6. A resilient strap 144 attached to frame 82 has a hook on the end thereof engaged with an eye on the latch member 142 to positively retain the latch member 142 in its released position against the bias of gravity or an internal spring. This enables the frame 90 to be freely movable without becoming automatically latched in its uppermost position such as might be necessary when working with the trap when on deck of a fishing vessel, or the like. A removable release pin 146 is provided in the block 138 in spaced relation to the pivot pin for the latch member 142 which will enable the latch member 142 to swing downwardly to a depending position in order to release the movable frame 90 when it is in its elevated position. Various types of one-way latch mechanisms may be provided for retaining the movable frame 90 in its elevated position with the one-way latch mechanism being manually releasable to facilitate movement of the frame 90 back to its lowered position.

Upwardly directed light structures 148 are provided adjacent diagonally opposite ends of the diagonal spaced rods 110 and 112, as illustrated in FIG. 5, and a downwardly facing light 150 is provided adjacent the center of the top of the trap structure 32. Additional downwardly and centrally directed lights 151 may be provided on the brace rods 42 or in other desired locations. When fishing for some species of marine life, a chemical light 152 may be secured to the bottom netting 48 by a conventional fastener 154 or bait hook which is in the form of an openable wire clasp of well-known construction. The various lights may be provided with reflectors, protective enclosures, and be of desired color depending upon circumstances encountered in each situation. Also, various conventional techniques are employed for securing the flexible lines or ropes in place and, where necessary, openings are provided for passage of such ropes. For example, in the depending flange or skirt 70, apertures would have to be provided to enable passage of the ropes 72. Also, at the corners of the frame 90, diagonal braces 91 may be provided across the corners with a reinforcing brace 93 to facilitate attachment of the lower ends of the lift ropes 120. The shape of pyramidal trap 30 is such that it facilitates stacking of the traps in a compact condition, as illustrated in FIGS. 12 and 13, with the upper frame 82 of a lower trap underlying and engaging the frame 60 of an upper superimposed trap, as illustrated in FIG. 13, thus spacing the pyramidal traps 30 from each other in the manner illustrated in FIGS. 12 and 13.

The spacing of the rods 110 and 112 is such that most species of marine life will not be able to pass therethrough. In order to assure that small species will not escape through the slot-like opening 126 when the lift ring 122 and ring 123 are lifted therefrom, a net 156 in the form of a bag net may be attached to the rods 110 and 112 where the soft insulation 124 is used, thereby preventing escape of small species of marine life through this area.

While the trap 20 has been disclosed in stacked relationship by removing the bottom 44, if the guard frame 50 is not used, the bottom frame 46 may be hingedly connected to the bottom frame 34 of the pyramidal trap 30 thus enabling the traps to be stacked with the bottom 44 extending laterally in a generally horizontal direction from the bottom edge of the pyramidal trap 30. This can be accomplished by the use of short ropes or other means which will securely mount the bottom 44 to the trap but when such devices are removed from all but one side thereof, the bottom can then swing downwardly for dumping the catch from the trap and also enabling stacking thereof without completely detaching the bottom from the trap. This trap is quite effective for use with marine life of both the swimming and crawling species with the trap being maintained in an open position so that it can fish for long periods of time especially when this type of marine life is scarce and long "soaking" periods are necessary. This trap also provides a large holding capacity but yet it can be stacked in a relatively small space without having to be collapsed, folded, or the like. Also, the structure of this trap prevents premature closing of the trap by heavy seas and does not require that the movable frame 90 have a relatively large weight. When the trap is picked up, it is closed, thus preventing marine life from escaping from the trap even if the trap floats or is permitted to move downwardly due to rolling of the fishing vessel inasmuch as the side netting will be retained in closed position by the latch mechanism. It is also within the purview of the present invention to provide components which can be separated from each other to enable collapse of the trap. For example, the vertical brace rods in the pyramidal trap 30 and/or in the trap structure 32 may be removable with respect to the frames to which they are connected, thus enabling the trap to be collapsed into a more compact condition. Also, the shape, configuration and dimensional characteristics of various components of the trap may be varied depending upon the individual requirements necessitated by conditions encountered under various fishing conditions.

Means other than the elastic ropes or straps 130 may be used to provide tension to prevent premature movement of the movable frame member 90 to trap closing position. For example, many rings of string or twine, each of which has a breaking strength substantially equal to the pull of the sea and current, are mounted on a short rope connected into rope 26 so that a snap hook or hooks on frame 102 can be connected to one of the twine rings each time the trap is placed overboard. The snap hook would have smooth external surfaces to prevent it from catching onto other twine rings. Also, any suitable spring loaded mechanism may be used to release 26 from its slack position at the desired pressure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combination marine life trap comprising a bottom trap having a top wall with a single opening therein, a top trap structure mounted on said top wall of the bottom trap in enclosing relation to the opening therein, said trap structure including a side net movable between open and closed positions to enable access to the interior of the bottom trap through the top trap structure when open and prevent escape of marine life when closed, and means connected with said side net to move it to closed position when the combination trap is lifted for preventing escape of marine life, said trap structure including an enclosure projecting upwardly from the top wall of the bottom trap, said side net extending completely about the periphery of the enclosure to enable access to the opening in the top wall from any direction when open, said enclosure including a plurality of vertical, circumferentially spaced guide means in the periphery thereof, a peripheral frame vertically movable along said guide means, said side net having a top edge secured to said movable frame and a bottom edge being connected with the top wall of the bottom trap peripherally of the opening therein, and an elastic band peripherally encircling said side net at the central portion thereof to fold the side net inwardly when the movable frame is in a lowered position, said side net having a vertical dimension such that the elastic band defines the periphery of an opening in alignment with the opening in the top wall of the bottom trap.

2. The combination trap as defined in claim 1, wherein said means to move the side net to closed position includes a lift line connected with said movable frame and extending to the surface of a body of water, float means connected to said lift line to retain the lift line accessible at the water surface.

3. The combination trap as defined in claim 2, wherein elastic means interconnects said lift line and said trap structure to maintain slack in the lift line whereby water and/or wind will not move the movable frame and side net from open position.

4. The combination trap as defined in claim 3, wherein said enclosure includes a top wall having diagonal guide slots therein, said lift line including two lines having ends secured to opposite corners of the movable frame and central portions received in said guide slots and passing through a rigid double eye connected to a lift line extending to the water surface.

5. The combination trap as defined in claim 4, wherein said movable frame includes opposed pairs of brace rods having the ends of the two lines connected thereto, said brace rods including reinforcing rods disposed in perpendicular relation thereto and rigidly affixed to the brace rod and movable frame, respectively.

6. The combination trap as defined in claim 4, wherein said enclosure top wall includes a pair of vertical spaced upper and lower peripheral frames with the upper frame having a smaller perimeter than the lower frame and concentric in relation thereto, said lower frame including brace rods thereon, said upper and lower frames being interconnnected by inclined frame means and netting thereby providing an inwardly slanted top portion on said enclosure to conserve vertical space when storing or stacking a plurality of traps.

7. The combination trap as defined in claim 1, together with means releasably retaining said movable frame in closed position.

8. The combination trap as defined in claim 4, wherein said trap structure includes net means associated with the guide slots in the top wall of said trap structure to prevent the escape of small marine life therethrough.

9. The combination trap as defined in claim 1, wherein said trap structure includes a top wall having a periphery, a short net depending from said periphery of the top wall within the guide means with the short net having a frame peripherally secured to the bottom edge thereof for engagement by the movable frame on the side net when in its elevated position thereby assuring that the periphery of the trap structure will be closed.

10. The combination trap as defined in claim 1, wherein said enclosure includes a top wall, said guide means for the movable frame includes a pair of vertically disposed, laterally spaced guide rods rigidly extending between the top wall of the bottom trap and the top wall of the enclosure, said movable frame being a ring slidably movable between said guide rods.

11. The combination trap as defined in claim 10, together with guide lines extending between the top wall of the bottom trap and the top wall of the enclosure at the corners thereof, said movable frame including eyes thereon slidably engaged on the guide lines to additionally guide the movable frame and to provide additional support between the trap structure and bottom trap.

12. The combination trap as defined in claim 11, wherein said guide lines include load supporting end portions interconnecting the top wall of the bottom trap adjacent the opening therein and the bottom of the bottom trap to enable large catches to be supported in the trap without damage.

* * * * *